United States Patent
Smith, Jr. et al.

(10) Patent No.: US 11,585,716 B2
(45) Date of Patent: Feb. 21, 2023

(54) PAD PRESENCE SENSING SYSTEM

(71) Applicant: J. Brasch Co., LLC, Lincoln, NE (US)

(72) Inventors: Gordon Smith, Jr., Lincoln, NE (US); John Joseph Brasch, Lincoln, NE (US)

(73) Assignee: J. Brasch Co., LLC, Lincoln, NE (US)

( * ) Notice: Subject to any disclaimer, the term of this patent is extended or adjusted under 35 U.S.C. 154(b) by 0 days.

(21) Appl. No.: 17/222,749

(22) Filed: Apr. 5, 2021

(65) Prior Publication Data
US 2021/0310891 A1 Oct. 7, 2021

Related U.S. Application Data

(60) Provisional application No. 63/004,574, filed on Apr. 3, 2020.

(51) Int. Cl.
*G01L 25/00* (2006.01)
*G01L 1/20* (2006.01)

(52) U.S. Cl.
CPC ............ *G01L 25/00* (2013.01); *G01L 1/20* (2013.01)

(58) Field of Classification Search
CPC ...... A61B 5/1115; G01L 27/007; G01R 31/55
See application file for complete search history.

(56) References Cited

U.S. PATENT DOCUMENTS

| | | | | |
|---|---|---|---|---|
| 5,410,297 A * | 4/1995 | Joseph | .................. | G08B 21/22 340/573.7 |
| 5,844,488 A * | 12/1998 | Musick | .................. | G08B 21/22 340/286.07 |
| 6,297,738 B1 * | 10/2001 | Newham | ................ | G08B 21/22 340/568.1 |
| 6,544,200 B1 * | 4/2003 | Smith | .................. | A61B 5/6892 600/595 |
| 7,924,163 B1 * | 4/2011 | Long | .................... | A61B 5/6892 340/666 |
| 8,085,154 B2 * | 12/2011 | Williams | ............. | A61B 5/0002 5/940 |
| 9,270,062 B2 * | 2/2016 | Zhou | .................... | H01R 13/641 |
| 10,247,634 B2 * | 4/2019 | Nakamura | ............ | G01L 19/083 |
| 2006/0163973 A1 * | 7/2006 | Ogino | .................... | G01R 31/54 310/338 |
| 2006/0191203 A1 * | 8/2006 | Ueda | ........................ | G01L 1/16 49/27 |
| 2012/0056611 A1 * | 3/2012 | Hsi | ....................... | G01R 31/69 324/76.11 |
| 2020/0230008 A1 * | 7/2020 | Newham | ............. | A61B 5/6894 |

* cited by examiner

*Primary Examiner* — Tran M. Tran
(74) *Attorney, Agent, or Firm* — Michael D. Eisenberg

(57) ABSTRACT

An aspect of some embodiments of the present invention relates to a system configured for detecting connection between a pressure pad and a monitor. The system includes a pressure detection circuit and a presence detection circuit. The pressure detection circuit is configured for sensing whether the pressure on the pad is above or below the threshold pressure. The presence detection circuit is configured for determining whether a connection between the monitor and the pad is intact. The presence detection circuit is configured to establish a high voltage condition that occurs when connection is broken along the presence detection circuit and a low voltage condition when the presence detection circuit is intact.

5 Claims, 4 Drawing Sheets

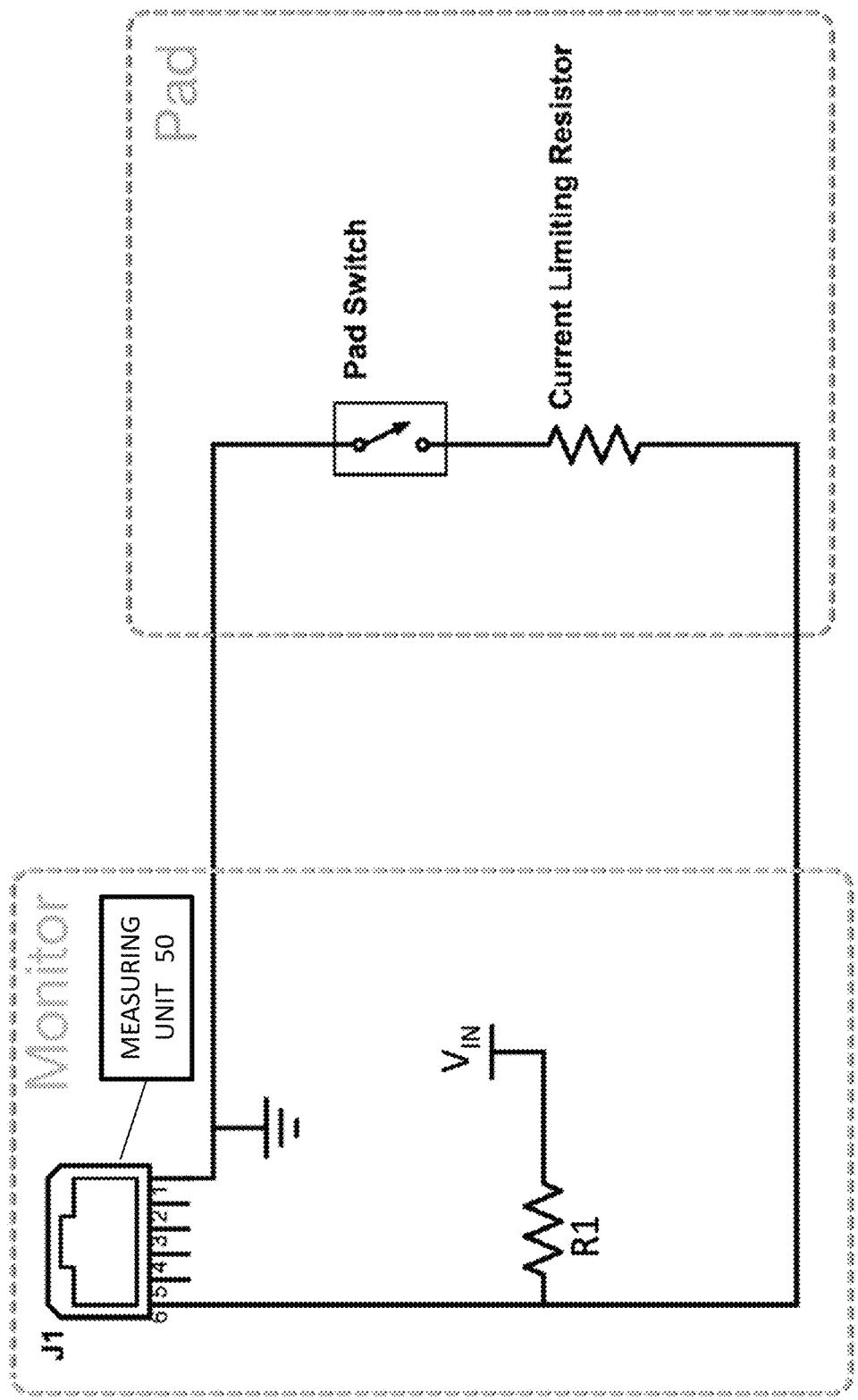
Fig. 1 (General Art)

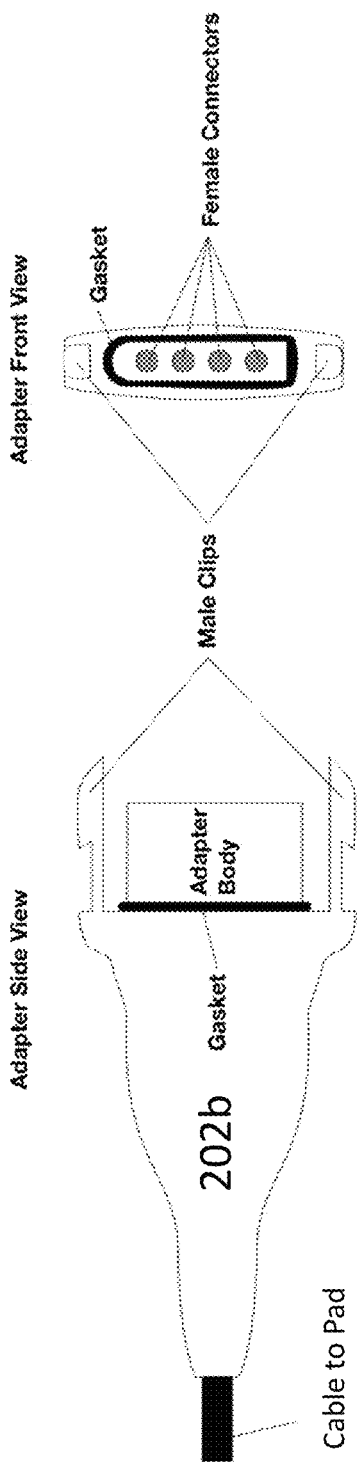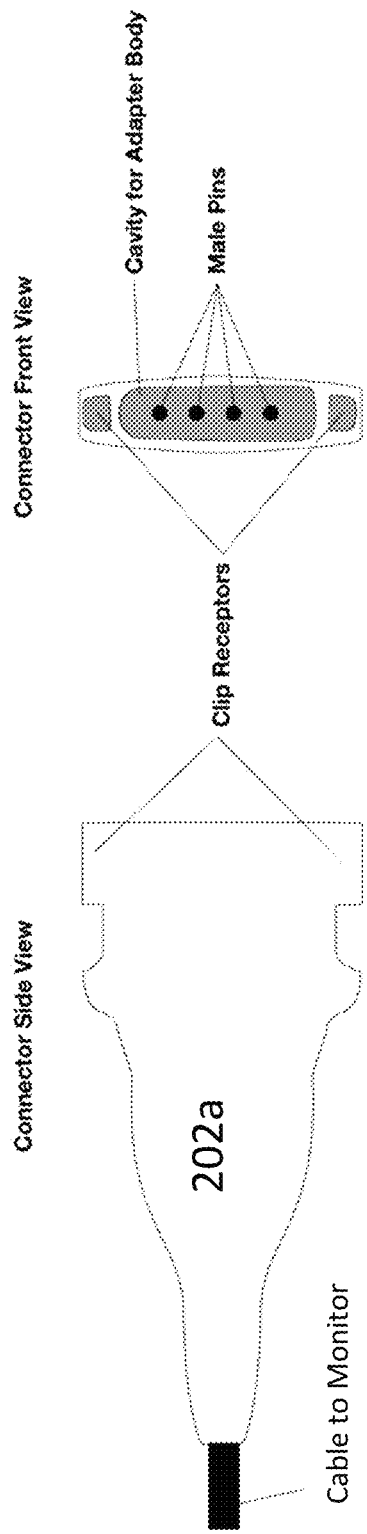

PAD PRESENCE SENSING SYSTEM

CROSS-REFERENCES TO RELATED APPLICATIONS

The present application claims priority to U.S. Provisional Application Ser. No. 63/004,574 filed on Apr. 3, 2020, which is hereby incorporated in its entirety.

BACKGROUND OF THE INVENTION

Standard bed pads for sensing the presence of a person on the bed are wired to a 6-pin or 4-pin jack J1 with the outside pair of wires connected to the sensing material, as seen in FIG. 1. This material acts as an open switch when pressure is absent from the pad and converts to a closed switch when weight is applied.

The detection line (for example, pin 6 or 4 for pressure detection, depending on whether the pin unit of the monitor has six or four pins) is connected to a (weak) pull-up resistor R1 connected to a power source having a predetermined input voltage VIN higher than ground (e.g., +5V), to establish a default high voltage condition at pin 6 when the switch is open. The detection line is also connected to ground in the vicinity of pin 1. The connection to ground is between pin 1 and the pad's switch, while the connection to the power source is between the pad's switch and the pin 6. Once the switch is closed in the pad between pins 1 and 6 (for a six-pin unit, or pins 1 and 4 for a four-pin unit), the signal in the circuit between pins 1 and 6 is pulled to ground. Thus, when the signal on pin 6 is measured to be at the high voltage condition, it is inferred that the pad switch is open, indicating that no pressure above a predetermined threshold is applied on the pressure pad (the patient is absent from the pad). When the signal on pin 6 is measured to be at low voltage condition (at or near ground), it is inferred that the pad switch is closed, indicating that pressure above a predetermined threshold is applied on the pad (the patient is present on the pad). The measuring unit 50 is part of the monitor and is connected to the jack J1 to measure the voltage at different pins.

BRIEF SUMMARY OF EMBODIMENTS OF THE INVENTION

The inventors have found that an issue with the above-mentioned design is what happens when the pad is disconnected during operation, which results in one of two scenarios:

1. If weight was applied before the disconnection occurs, the monitor will have been armed and the disconnection will bring about a high-voltage (e.g., +5V) condition, which will be erroneously inferred to determine an opening of the pad switch indicative of a pressure release and triggering a fall alert.

2. If weight was not applied before the disconnection occurs, the monitor will be idle and the hardware disconnection will be missed, as the measurement in the disconnected circuit will still show a high-voltage (e.g., +5V) condition. This can cause a scenario in which the next patient to utilize the pad will not be detected unless a staff member notices the disconnected pad.

Therefore, an aspect of some embodiments of the present invention relates to a system configured for detecting connection between a pressure pad and a monitor. The pressure pad comprises a pressure sensitive zone configured to act as an open switch when a pressure on the pressure pad is below a threshold pressure and to act as a closed switch when the pressure on the pressure pad is above the threshold pressure, and wherein the monitor comprises a jack having a first external pin, a second external pin, and one or more intermediate pins located between the external pins. The system includes a pressure detection circuit and a presence detection circuit. The pressure detection circuit is configured for sensing whether the pressure on the pad is above or below the threshold pressure. The pressure detection circuit starts at the first external pin and ends at the second external pin, and connects the first and second external pins in series with the pressure sensitive zone. The pressure detection circuit further comprises a first connection to ground in the monitor located between the pressure sensitive zone and the first external pin and a second connection via a first weak pull-up resistor in the monitor to a power source having a predetermined input voltage higher than ground, the second connection being located between the pressure sensitive zone and the second external pin. The presence detection circuit is configured for determining whether a connection between the monitor and the pad is intact. The presence detection circuit starts at the first external pin and ends at a selected intermediate pin of the one or more intermediate pins, and shares a first pathway from the first external pin toward the pad and the first connection to ground with the pressure detection circuit. The presence detection circuit comprises a shorting connection on the first pathway before reaching the pressure sensitive zone, the shorting connection leading to the selected intermediate pin via a second pathway not shared with the pressure detection circuit. The second pathway has a third connection to the power source via a second weak pull-up resistor in the monitor. The pressure detection circuit is configured to establish a first high voltage condition at the second external pin that occurs when the pressure sensitive zone acts as an open switch and a first low voltage condition at the second external pin when the pressure sensitive zone acts as a closed switch, such that measurement of the voltage at the second external pin can be used to determine whether the pressure sensitive zone acts as an open switch or a closed switch, thereby indicating whether the pressure on the pad is below or above the pressure threshold. The presence detection circuit is configured to establish a second high voltage condition at the selected intermediate pin that occurs when connection is broken along the presence detection circuit and a second low voltage condition at the selected intermediate pin that occurs when the presence detection circuit is intact.

In a variant, the shorting connection is in the pad.

In some embodiments of the present invention, the system further comprising a connecting device between the monitor and the pad, the connecting device comprising a connector and an adapter configured to be removably joined to each other to complete the pressure detection circuit and the presence detection circuit.

In a variant, the connector is connected to the monitor and comprises a cavity housing a number of male pins corresponding to and connected to the pins of the jack; the adapter is connected to the pad and comprises a protruding adapter body having a plurality of female connectors; the cavity of the connector is configured to receive the adapter body, such that the female connectors are configured to receive the respective male pins to complete the pressure detection circuit and the presence detection circuit.

In another variant, the adapter comprises clips, while the connector comprises clip receptors configured to receive the clips to removably lock the adapter and connector together.

Another variant of some embodiments of the present invention relates to a system configured for detecting pressure on a pressure pad. The system comprises a pressure pad, a monitor, a pressure detection circuit, and a presence detection circuit. The pressure pad comprises a pressure sensitive zone configured to act as an open switch when a pressure on the pressure pad is below a threshold pressure and to act as a closed switch when the pressure on the pressure pad is above the threshold pressure. The monitor is configured to be connected to the pressure pad, the monitor comprising a jack having a first external pin, a second external pin, and one or more intermediate pins located between the external pins. The pressure detection circuit is configured for sensing whether the pressure on the pad is above or below the threshold pressure. The pressure detection circuit starts at the first external pin and ends at the second external pin, and connects the first and second external pins in series with the pressure sensitive zone. The pressure detection circuit further comprises a first connection to ground located in the monitor between the pressure sensitive zone and the first external pin and a second connection via a first weak pull-up resistor in the monitor to a power source having a predetermined input voltage higher than ground, the second connection being located in the monitor, between the pressure sensitive zone and the second external pin. The presence detection circuit is configured for determining whether a connection between the monitor and the pad is intact. The presence detection circuit starts at the first external pin and ends at a selected intermediate pin of the one or more intermediate pins, the presence detection circuit sharing a first pathway from the first pin toward the pad with the pressure detection circuit and the first connection to ground, and comprises a shorting connection on the first pathway before reaching the pressure sensitive zone. The shorting connection leads to the selected intermediate pin via a second pathway not shared with the pressure detection circuit and having a third connection to the power source via a second weak pull-up resistor in the monitor. The pressure detection circuit is configured to establish a first high voltage condition at the second external pin that occurs when the pressure sensitive zone acts as an open switch and a first low voltage condition at the second external pin when the pressure sensitive zone acts as an open switch, such that measurement of the voltage at the second external pin can be used to determine whether the pressure sensitive zone acts as an open switch or a closed switch, thereby indicating whether the pressure on the pad is below or above the pressure threshold. The presence detection circuit is configured to establish a second high voltage condition at the selected intermediate pin that occurs when connection is broken along the presence detection circuit and a second low voltage condition at the selected intermediate pin when the presence detection circuit is intact.

In a variant, the shorting connection is in the pad.

In some embodiments of the present invention, the system further comprising a connecting device between the monitor and the pad, the connecting device comprising a connector and an adapter configured to be removably joined to each other to complete the pressure detection circuit and the presence detection circuit.

In a variant, the connector is connected to the monitor and comprises a cavity housing a number of male pins corresponding to and connected to the pins of the jack; the adapter is connected to the pad and comprises a protruding adapter body having a plurality of female connectors; the cavity of the connector is configured to receive the adapted body, such that the female connectors are configured to receive the respective male pins to complete the pressure detection circuit and the presence detection circuit.

In another variant, the adapter comprises clips, while the connector comprises clip receptors configured to receive the clips to removable lock the adapter and connector together.

BRIEF DESCRIPTION OF DRAWINGS

FIG. 1 is a circuit schematic of a monitor and a pressure pad, configured to determine whether pressure above a predetermined threshold is applied to the pad, as known in the general art;

FIG. 3 illustrates an adapter connected to the pressure pad and configured to be connected to the monitor, according to some embodiments of the present invention; and FIG. 4 illustrates a connector of the monitor configured to be connected to the adapter of the pad, according to some embodiments of the present invention.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

In order to account for the above-described circumstances related to the disconnection between the pad and the monitor, an aspect of some embodiments of the present invention relates to the addition of a tamper sensor circuit to each monitor pad connection, as well as a pin-short within the pads, to allow the tamper sensor circuit to detect a disconnection. In order to implement this feature, two circuit updates are provided: one in the monitor circuit and one in the pad circuit.

Monitor Circuit

Figure 2A:
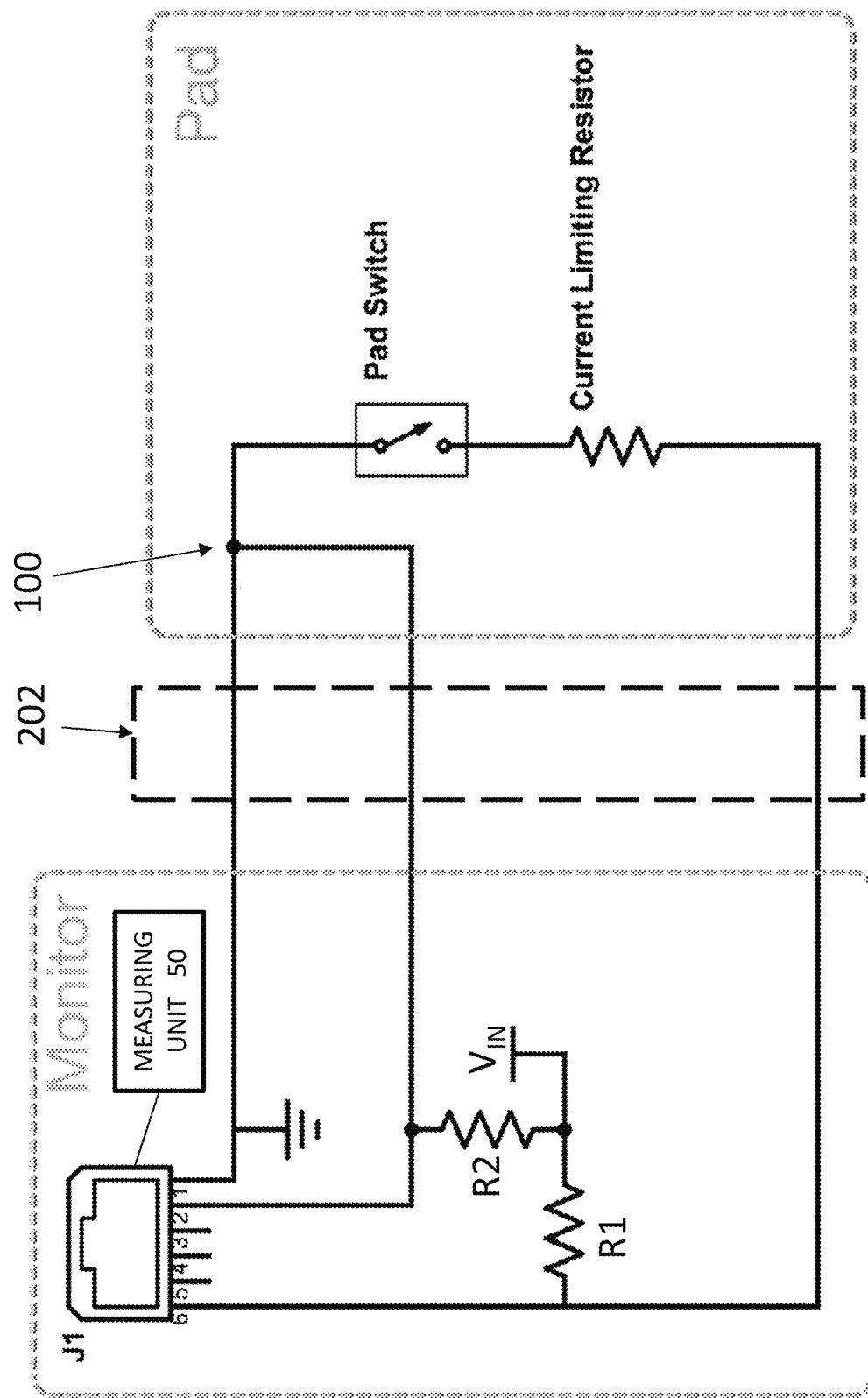
FIG. 2a is a circuit schematic of a monitor and a pressure pad, configured to determine whether pressure above a predetermined threshold is applied to the pad and to detect a disconnection between the monitor and pressure, according to some embodiments of the present invention.
Figure 2B:
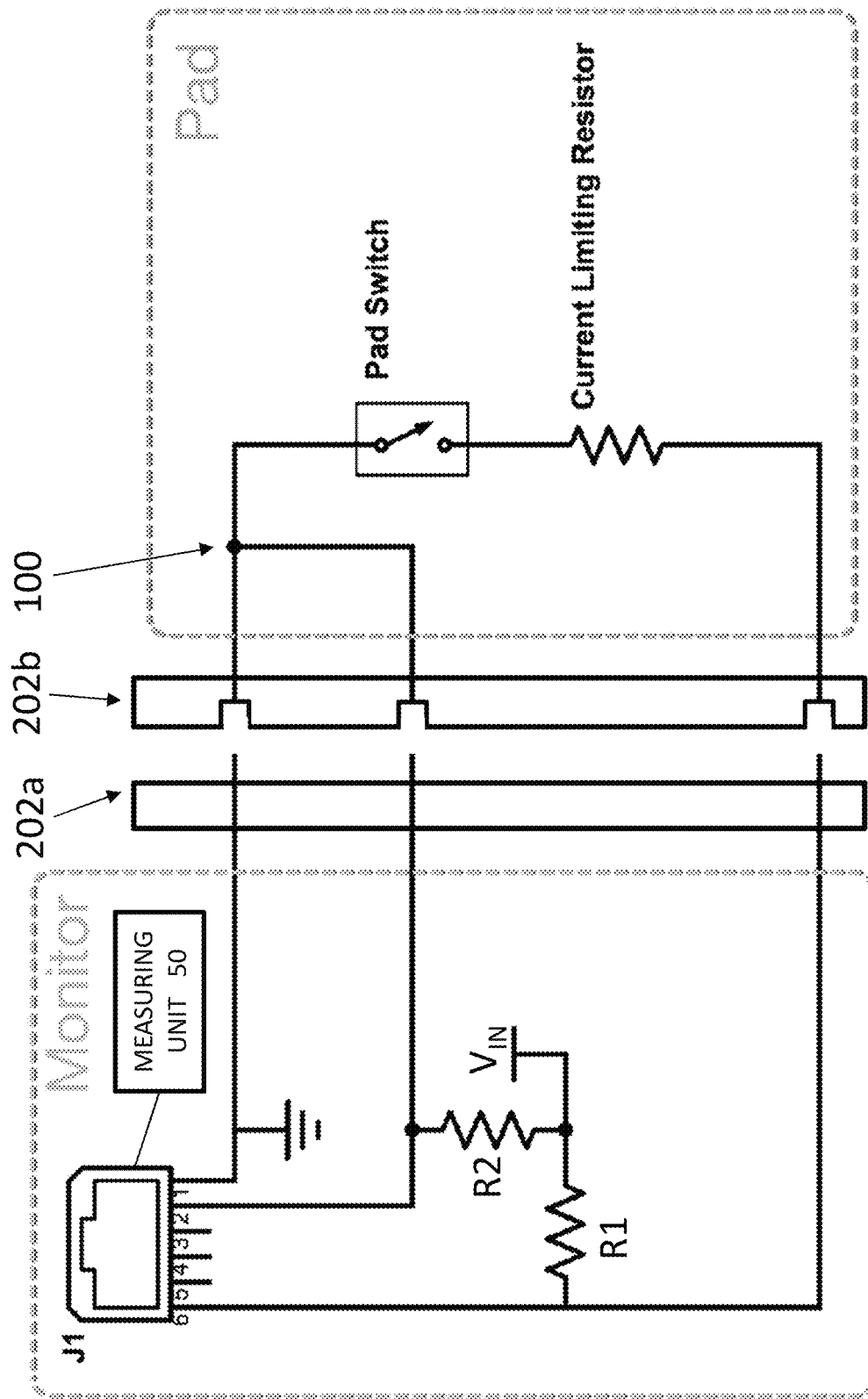
FIG. 2b is the circuit schematic of FIG. 2a, in which a connector and adapter a disconnected, according to some embodiments of the present invention.

As shown in FIGS. 2a and 2b, the pressure detection circuit needed in the monitor is identical to a standard pad pressure detection circuit known in the art, as the intent is to detect an open or closed switch. In the present invention, a presence circuit is added to detect the connection between the pad and the monitor. The measuring unit 50 is part of the monitor and is connected to the jack J1 to measure the voltage at different pins of the jack J1. In some embodiments of the present invention, the measuring unit 50 includes a microcontroller which uses General Purpose Input/Output (GPIO) pins connected to the desired pins to measure the voltage of the pins of the jack J1.

The monitor includes a jack J1 having at least three pins (such as three, four, six): two external pins and at least one intermediate pin. J1 may be, for example, a female RJ-11 or RJ-12 phone jack. The monitor and pad are optionally connected via a connector device 202 configured for allowing the pad to be removed and replaced. The connector device 202 includes connector 202a and an adapter 202b configured to be selectively joined (FIG. 2a) and separated (FIG. 2b).

While the pressure detection circuit measures across the external pins of the jack J1 (Pins 1 and 6 for a six-pin jack, or Pins 1 and 4 for a four-pin jack), the presence circuit measures across an external pin (such as Pin 1, for example) and an intermediate pin (such as Pin 2, for example). Each detection line (for example, pin 6 or 4 for pressure detection, depending on whether the pin unit of the monitor has six or four pins, and pin 2 for presence) is connected to a respective (weak) pull-up resistor (R1, R2) connected to a power source with predetermined input voltage VIN higher than ground (e.g., +5V), to establish a default high voltage condition. The detection line is also connected to ground in the vicinity of pin 1. Once the switch is closed in the pad between Pins 1 and 6 (for a six-pin unit), the signal in the circuit between pins 1 and 6 is pulled to ground. Thus, when the signal on pin 6 is measured to be at the high voltage condition, it is inferred that the pad switch is open, indicating that no pressure above a predetermined threshold is applied on the pressure pad (the patient is absent). When the signal on pin 6 is measured to be at ground, it is inferred that the pad switch is closed, indicating that pressure above a predetermined threshold is applied on the pad (the patient is present).

VIN is dependent on the operating voltage of the monitor and can vary. For example, in most battery operated units this would be 3.3V or 5V transistor-transistor logic (TTL) levels.

R1 and R2 are weak pull-up resistors and therefore should have very large resistance values. For example, R1 and R2 may have a resistance greater than 10 kOhm, and less than 100 kOhms. If the resistances of R1 and R2 are too low (for example, below 10 kOhm) they become strong pull-up resistors and can negatively affect the input signals.

Pad Circuit

The second circuit addition required is a connection 100 inside the sensor pad which shorts together an external pin a with an intermediate pin (Pins 1 and 2, for example). This provides a permanent physical closure which can be detected once the sensor pad is connected to the monitor.

When the there is no disconnection, the signal at pin 2 is pulled to ground, establishing a second low voltage condition (near or at ground) indicative of an intact connection. If the disconnection occurs, regardless of pad switch state, the short between Pins 1 and 2 is broken, and a second high voltage condition powered by VIN will be detected on pin 2. This high voltage indicates that the short is broken, as, had the presence circuit been intact, voltage in the presence circuit, as detected by pin 2, would have been pulled to ground due to the short at connection 100 to pin 1.

Optionally, the short connection 100 is located as far down in the wiring harness or sensor pad material as possible. If the short was established high in the wiring harness (near the connector unit 202), and the disconnection occurred far down in the sensor pad, the disconnection of the sensor pad would be mis-detected as an opening of the pad switch. By placing the short connection 100 as far from the connector device 202 as possible as possible (i.e., near or within the pad sensor material), the circuit on the monitor side not only detects a disconnection due to a separation in the connector device 202 between the monitor and pressure pad, but additionally detects major wiring harness damage such as a cut in the wiring between the pad and the connector, for example due to an actuating bed or chair. This is due to the fact that significant damage anywhere along the wiring harness will cause the short to break, triggering the presence circuit in the monitor.

Dongle Connection

In some embodiments of the present invention, the pad also contains a connector device 202 between the sensor pad and the monitor, as shown in FIGS. 3 and 4.

The connector device includes a connector 202a (FIG. 4) connected to the monitor, and an adapter 202b (FIG. 3) connected to the pad. The connector and the adapter are removably joined to each other. When the connector and the adapter are joined together, the pressure detection circuit and the presence circuit are completed. The connector 202a has a number of male pins corresponding to and connected to the pins in the jack J1 of the monitor and located in a cavity of the connector. To be precise, the male pins of the connector respectively correspond to and are connected to at least all of the following: the first external pin, the intermediate pin that is part of the presence circuit, and second external pin. More male pins may be present in the connector, to connect to other intermediate pins of the jack J1 that are unused in the pressure detection circuit and in the presence circuit. The adapter 202b has a protruding adapter body configured for entering the cavity of the connector, thereby joining the adapter and connector. The adapter body includes female connectors connected to portions of the pressure detection circuit and the presence detection circuit that are in the pad. The female connectors are configured to receive the male pins of the connector in order to complete the pressure detection circuit and the presence circuit, as shown in FIGS. 2a and 2b. The number of female connectors in the adapter may exceed the number of the portions of the pressure detection circuit and the presence detection circuit located in the pad, but only three of the female connectors are connected to the portions of the pressure detection circuit and the presence detection circuit that are in the pad.

This provides one standard adapter on the pads and provide a dongle "pigtail" which converts the adapter 202b to the connector 202a and pin requirements of the jack J1 of the consuming monitor (i.e. 4-pin RJ11, 6-pin RJ11, mini-stereo, etc). In some embodiments of the present invention, the breakable component such as clips is located on the adapter 202b, while clip receptors are located on the connector 202a, to receive the clips to removably lock the adapter and connector together. This allows the adapter to be replaced if damaged, without having to dispose of the pad. The scope of the present invention also extends to the embodiment in which the clips are located in the connector 202a while clip receptors are located adapter 202b.

When the adapter and the connector are connected together, the pressure detection circuit and the presence circuit are completed. In this scenario the shorting connection of the sensing of the presence circuit between pins 1 and 2 is placed between the adapter 202b and pad or inside the pad to allow the monitor to detect the scenario in which the adapter is still connected to the monitor via the connector, but the disconnection occurs between the adapter 202b and pad or inside the pad.

Connector Configurations

In the examples of FIGS. 3 and 4, a four-pin connector is shown, but only three conductors are used. The technique of the present invention can be used on any connection with at least 3 lines such as a 6-pin or 4-pin RJ11 style plug, a ¼ inch audio, mini-audio, micro-audio, or other custom connectors.

Although the invention is described above in terms of various exemplary embodiments and implementations, it should be understood that the various features, aspects, time measurements, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The invention claimed is:

1. A system configured for detecting connection between a pressure pad and a monitor, wherein the pressure pad comprises a pressure sensitive zone configured to act as an open switch when a pressure on the pressure pad is below a threshold pressure and to act as a closed switch when the pressure on the pressure pad is above the threshold pressure, and wherein the monitor comprises a jack having a first external pin, a second external pin, and one or more intermediate pins located between the external pins, the system comprising:

a pressure detection circuit configured for sensing whether the pressure on the pad is above or below the threshold pressure, the pressure detection circuit starting at the first external pin and ending at the second external pin, and connecting the first external pin and the second external pin in series with the pressure sensitive zone, the pressure detection circuit further comprising a first connection to ground located in the monitor between the pressure sensitive zone and the first external pin and comprising a second connection via a first weak pull-up resistor to a power source having a predetermined input voltage higher than ground, the second connection being located in the monitor between the pressure sensitive zone and the second external pin a presence detection circuit configured for determining whether a connection between the monitor and the pad is intact, the presence detection circuit starting at the first external pin and ending at a selected intermediate pin of the one or more intermediate pins, the presence detection circuit sharing with the pressure detection circuit a first pathway from the first pin toward the pad and the first connection to ground, and comprising a shorting connection on the first pathway before reaching the pressure sensitive zone, the shorting connection leading to the selected intermediate pin via a second pathway not shared with the pressure detection circuit and having a third connection to the power source via a second weak pull-up resistor in the monitor;

wherein each of the first weak pull-up resistor and the second weak pull-up resistor has a resistance between 10 kOhms and 100 kOhms;

wherein the pressure detection circuit is configured to establish a first high voltage condition at the second external pin that occurs when the pressure sensitive zone acts as an open switch and a first low voltage condition at the second external pin when the pressure sensitive zone acts as a closed switch, such that measurement of the voltage at the second external pin can be used to determine whether the pressure sensitive zone acts as an open switch or a close switch, thereby indicating whether the pressure on the pad is below or above the pressure threshold; and wherein the presence detection circuit is configured to establish a second high voltage condition at the selected intermediate pin that occurs when connection is broken along the presence detection circuit and a second low voltage condition at the selected intermediate pin when the presence detection circuit is intact.

2. The system of claim 1, wherein the shorting connection is in the pad.

3. The system of claim 1, further comprising a connecting device between the monitor and the pad, the connecting device comprising a connector and an adapter configured to be removably joined to each other to complete the pressure detection circuit and the presence detection circuit.

4. The system of claim 3, wherein:

the connector is connected to the monitor and comprises a cavity housing a number of male pin corresponding to and connected to at least the first external pin, the selected intermediate pin, and the second external pin of the jack;

the adapter is connected to the pad and comprises a protruding adapter body having a plurality of female connectors;

the cavity of the connector is configured to receive the adapted body, such that the female connectors are configured to receive the respective male pins to complete the pressure detection circuit and the presence detection circuit.

5. The system of claim 3, wherein:

the adapter comprises clips;

the connector comprises clip receptors configured to receive the clips to removable lock the adapter and connector together.

* * * * *